United States Patent
Jin et al.

(10) Patent No.: US 7,049,739 B2
(45) Date of Patent: May 23, 2006

(54) FIELD EMISSION DEVICE

(75) Inventors: Yong-wan Jin, Seoul (KR); Jung-woo Kim, Kyungki-do (KR); Jae-eun Jung, Seoul (KR); Young-jun Park, Kyungki-do (KR)

(73) Assignee: Samsung SDI Co., Ltd., Suwon-si (KR)

( * ) Notice: Subject to any disclaimer, the term of this patent is extended or adjusted under 35 U.S.C. 154(b) by 154 days.

(21) Appl. No.: 10/730,911

(22) Filed: Dec. 10, 2003

(65) Prior Publication Data

US 2004/0183420 A1    Sep. 23, 2004

(30) Foreign Application Priority Data

Dec. 10, 2002    (KR) ............... 10-2002-0078169

(51) Int. Cl.
*H01J 1/62*    (2006.01)
(52) U.S. Cl. ............... 313/495; 313/309; 313/336; 313/351
(58) Field of Classification Search ............... 313/309, 313/310, 336, 351, 495
See application file for complete search history.

(56) References Cited

U.S. PATENT DOCUMENTS

| 3,789,471 A |  | 2/1974 | Spindt et al. |
| 6,437,503 B1 | * | 8/2002 | Konuma ............... 313/495 |
| 6,440,761 B1 |  | 8/2002 | Choi |

FOREIGN PATENT DOCUMENTS

| JP | 06150836 A | * | 5/1994 |
| JP | 2000-348599 |  | 12/2000 |
| JP | 2002-157953 |  | 5/2002 |

* cited by examiner

*Primary Examiner*—Vip Patel
(74) *Attorney, Agent, or Firm*—Buchanan Ingersoll PC

(57) ABSTRACT

A field emission device using carbon nanotubes (CNTs) is provided. The field emission device includes a cathode on which a plurality of CNT emitters are arranged, a gate insulating layer having a through hole through which electrons emitted from the CNT emitters pass, and a gate electrode which corresponds to the through hole of the gate insulating layer and has an enlongated gate hole that forms an electric field having different strengths in a first direction and in a second direction orthogonal to the first direction.

18 Claims, 14 Drawing Sheets

FIELD EMISSION DEVICE

BACKGROUND OF THE INVENTION

This application claims the priority of Korean Patent Application No. 2002-78169, filed on Dec. 10, 2002, in the Korean Intellectual Property Office, the disclosure of which is incorporated herein in its entirety by reference.

1. Field of the Invention

The present invention relates to a field emission device, and more particularly, to a field emission device using carbon nanotubes (CNTs).

2. Description of the Related Art

Carbon nanotubes (CNTs), by which field emission is performed even at a very low voltage due to their small diameter and pointed tube, are similar to fulleren ($C_{60}$). Since they have an excellent electron emission characteristic and chemical and mechanical durability, their physical properties and applications have steadily been studied. A Spindt-type (U.S. Pat. No. 3,789,471) field emission emitter, which is generally used for field emission displays, uses a micro-tip as an emitter for emitting electrons. The emitter has a problem in that the life span of a micro-tip is shortened due to atmospheric gases or a non-uniform field during a field emission operation. In addition, with such a conventional metal emitter, a work function must be decreased to decrease a driving voltage for field emission, but there are limitations. To overcome this problem, field emission arrays using carbon nanotubes which have a substantially high aspect ratio, excellent durability due to their structure being similar to that of $C_{60}$, and excellent electron conductivity, as an electron emission source, have been studied.

FIG. 1 schematically illustrates the sectional structure of a CNT electron gun of a conventional field emission array having one gate electrode which is disclosed in U.S. Pat. No. 6,440,761.

A cathode 2 is formed on a substrate 1, and a cathode insulating layer 3 that has an opening 3a which covers part of the cathode 2 and through which the center of the cathode 2 is exposed, is formed on the cathode 2. A gate insulating layer 4 and a gate electrode 5 which have a through hole 4a and a gate hole 5a, respectively, larger than the opening 3a of the cathode insulating layer 3, are formed on the cathode insulating layer 3. Meanwhile, grown or coated CNT emitters 8 are provided on the top of the cathode 2. In FIG. 1, reference numerals 9, 9b, and 9c denote a front substrate, an anode, and a phosphor layer, respectively.

FIG. 2 schematically illustrates the sectional structure of a CNT electron gun of a conventional field emission array having two gate electrodes. The electron gun has a structure in which a second gate insulting layer 6 and a second gate electrode 7 on the second gate insulating layer 6 are added to the electron gun shown in FIG. 1. Specifically, a first gate insulting layer 4 and a first gate electrode 5 which have a through hole 4a and a first gate hole 5a, respectively, larger than the opening 3a of the cathode insulating layer 3, are formed on the cathode insulating layer 3. The second gate insulting layer 6 and the second gate electrode 7 which have a through hole 6a and a second gate hole 7a, respectively, greater than the first gate hole 5a of the first gate electrode 5, are formed on the first gate electrode 5. Meanwhile, grown or coated CNT emitters 8 are provided on the top of the cathode 2.

The field emission device having the structure shown in FIG. 2, unlike the field emission device shown in FIG. 1, has two gate electrodes, i.e., first and second gate electrodes, thereby performing electron control such as prevention of internal arcing and effective focusing. FIG. 3 is a plan photograph showing the structure of a conventional field emission device having four electron guns arranged in one pixel and illustrates the shape and relation of the CNT emitters 8 and openings 8 and 6a of a gate electrode of the conventional CNT field emission device.

A field emission device using a CNT electron gun, unlike a field emission device using Spindt-type micro-tips, emits electrons from most CNTs of most CNT emitters on a cathode, and thus has a high current density. On the other hand, electrons emitted over wider range can reach the phosphor in unintended areas. Thus, if the field emission device using CNTs as an electron emission material cannot effectively control electrons emitted from CNTs, color purity and luminance may be lowered.

Also, each electron gun of the conventional field emission device corresponds to one pixel and includes CNT emitters formed in a circular shape and openings 5a and 6a of a gate electrode having a circular shape corresponding to the CNT emitters, as shown in FIG. 4. Electrons are uniformly dispersed in all directions from each electron gun such that emitted electrons reach the phosphor in neighboring, unintended areas as described above, and color purity and luminance is further lowered.

Likewise, in a field emission device having a structure in which a plurality of electron guns corresponding to one pixel are provided, in order to obtain good picture quality, electrons emitted from each electron gun should converge on an intended area of the phosphor and not on any other area.

SUMMARY OF THE INVENTION

The present invention provides a carbon nanotube (CNT) field emission device which effectively controls electrons emitted from CNT emitters of a plurality of electron guns.

The present invention further provides a CNT field emission device which realizes good quality images.

According to one aspect of the present invention, there is provided a field emission device. The field emission device includes a cathode on which a plurality of CNT emitters are arranged, a gate insulating layer having a through hole through which electrons emitted from the CNT emitters pass, and a gate electrode which corresponds to the through hole of the gate insulating layer and has an enlongated gate hole that forms an electric field having different strengths in a first direction and in a second direction orthogonal to the first direction.

According to another aspect of the present invention, there is provided a field emission device. The field emission device includes a plurality of parallel cathodes that extend in a first direction, a plurality of parallel gate electrodes which extend in a second direction orthogonal to the first direction and have enlongated gate holes formed where the cathodes overlap that form an electric field with difference strengths in the first and second directions, a plurality of CNT emitters which correspond to the gate holes and are formed on the cathodes, and a gate insulating layer interposed between the cathodes and the gate electrodes.

According to another aspect of the present invention, there is provided a field emission device. The field emission device includes a plurality of parallel cathodes that extend in a first direction, a plurality of parallel first gate electrodes which extend in a second direction orthogonal to the first direction and have a first gate holes formed where the cathodes overlap, a first gate insulating layer in which first through holes that correspond to the first gate holes formed between the cathodes and the first gate electrodes are formed, a second gate insulating layer in which second through holes that correspond to the first gate holes are formed, and a second gate electrode which is formed on the second gate insulating layer and in which enlongated gate holes that form an electric field having different strengths in the first and second directions is formed.

The gate hole has an enlongated slot shape. In particular, preferably, the gate hole is enlongated in a direction of a gate electrode in parallel.

In addition, at least two CNT emitters are disposed side by side and correspond to one of the asymmetric gate holes, and preferably, the two CNT emitters have a half-circle or crescent.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Hereinafter, preferred embodiments of a field emission device according to the present invention will be described in detail with reference to the accompanying drawings. First, the field emission device according to the present invention includes a plurality of parallel cathodes and gate electrodes that are arranged in an X-Y matrix shape. A stack structure of the cathode, the gate electrode, and a carbon nanotube (CNT) emitter provided in a portion where the cathode crosses the gate electrode may be substantially identical with a conventional field emission device as described above or the same as other already-known field emission devices. Accordingly, the basic structure of a field emission device according to the present invention will not be described in detail, and the inventive technical features of the field emission device according to the present invention will be clarified hereinafter.

Figure 5:
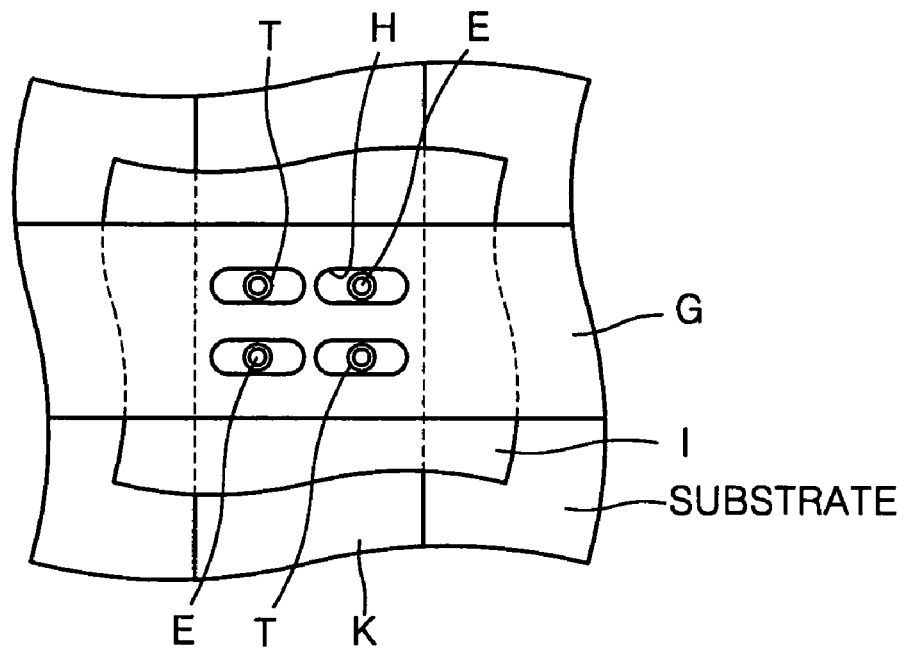
FIG. 5 is a schematic plan view illustrating an embodiment of a field emission device according to the present invention.
Figure 6:
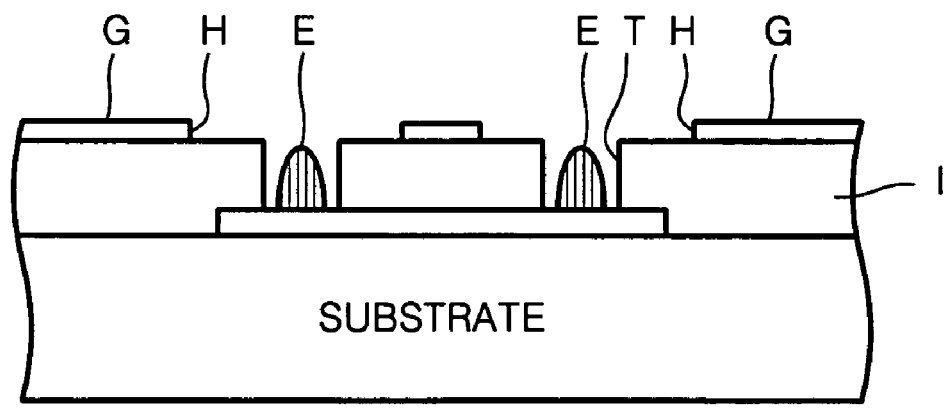
FIG. 6 is a schematic cross-sectional view illustrating the field emission device shown in FIG. 5, according to the present invention.

FIG. 5 is a schematic extracted plan view illustrating an embodiment of a field emission device according to the present invention in which a cathode and a gate electrode are arranged in an X-Y matrix shape, and FIG. 6 is a cross-sectional view of FIG. 5.

As shown in FIGS. 5 and 6, a cathode K in a first direction (vertical direction in the drawings) and a gate electrode G in a second direction (horizontal direction in the drawings) are orthogonally arranged on a substrate, and an insulating layer I is arranged therebetween. In an embodiment of the present invention, four CNT emitters E are provided at a portion where the cathode K crosses the gate electrode G, but in other embodiments of the present invention, only one CNT emitter or more CNT emitters may be provided at the portion. The CNT emitters E are formed on the cathode K, and four enlongated gate holes H corresponding to each of the CNT emitters E are formed in the gate electrode G. The insulating layer I electrically insulates the gate electrode and the cathode, as in a traditional field emission device, and has a through hole T corresponding to the CNT emitter.

Figure 7:
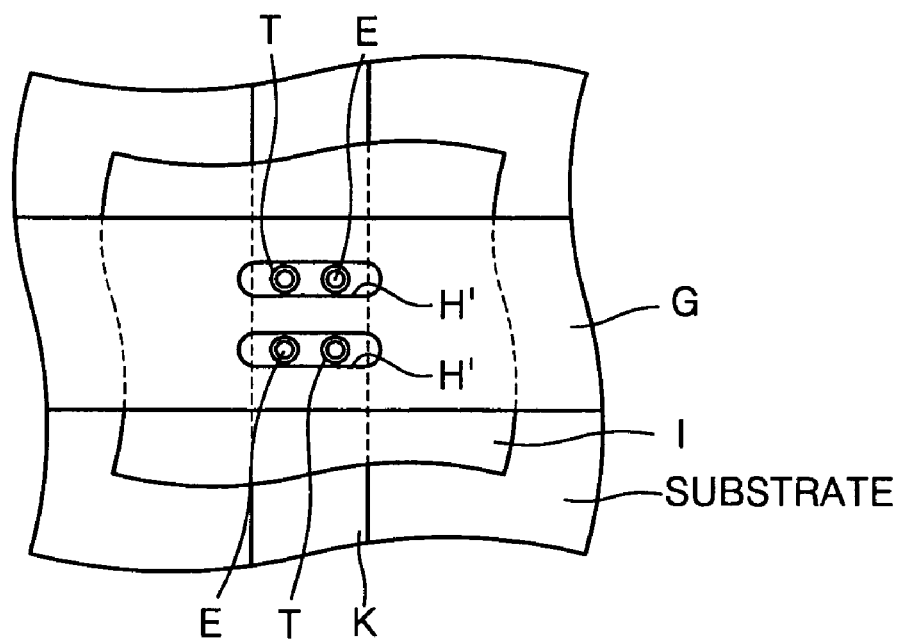
FIG. 7 is a schematic plan view illustrating an embodiment of a field emission device according to the present invention.
Figure 8:
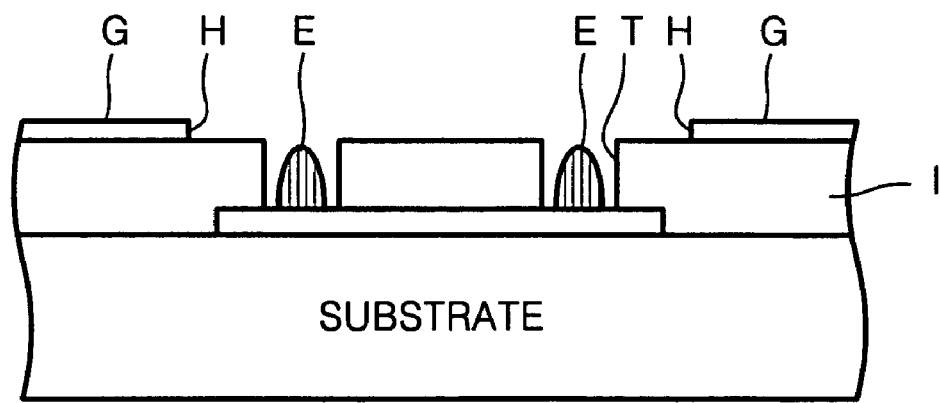
FIG. 8 is a schematic cross-sectional view illustrating the field emission device shown in FIG. 7, according to the present invention.

FIG. 7 is a schematic plan view of another embodiment of a field emission device shown in FIGS. 5 and 6, according to the present invention in which two CNT emitters E are arranged to correspond to one enlongated hole H'. FIG. 8 is a cross-sectional view of the field emission device shown in FIG. 7.

As shown in FIG. 7, a cathode K in a first direction (vertical direction in the drawing) and a gate electrode G in a second direction (horizontal direction in the drawing) are orthogonally arranged on a substrate, and an insulating layer I is arranged therebetween. In an embodiment of the present invention, four CNT emitters E are provided at a portion where the cathode K crosses the gate electrode G, but in other embodiments of the present invention, only one CNT emitter or more CNT emitters may be provided at the portion. The CNT emitters E are formed on the cathode K, and two enlongated gate holes H' corresponding to the two adjacent CNT emitters E are formed in the gate electrode G. The insulating layer I electrically insulates the gate electrode and the cathode, as in a traditional field emission device, and has a through hole T corresponding to the CNT emitter.

The common features of the two embodiments described above are that they have an asymmetric structure in which the gate holes H and H' of the gate electrode G that induce electron emission from the CNT emitters E are enlongated in a single direction. Such gate holes H and H' form different electric fields in a first direction and a second direction orthogonal to the first direction. Such asymmetric electric fields result in a difference in local electron emission from the CNT emitters E.

Figure 9A:
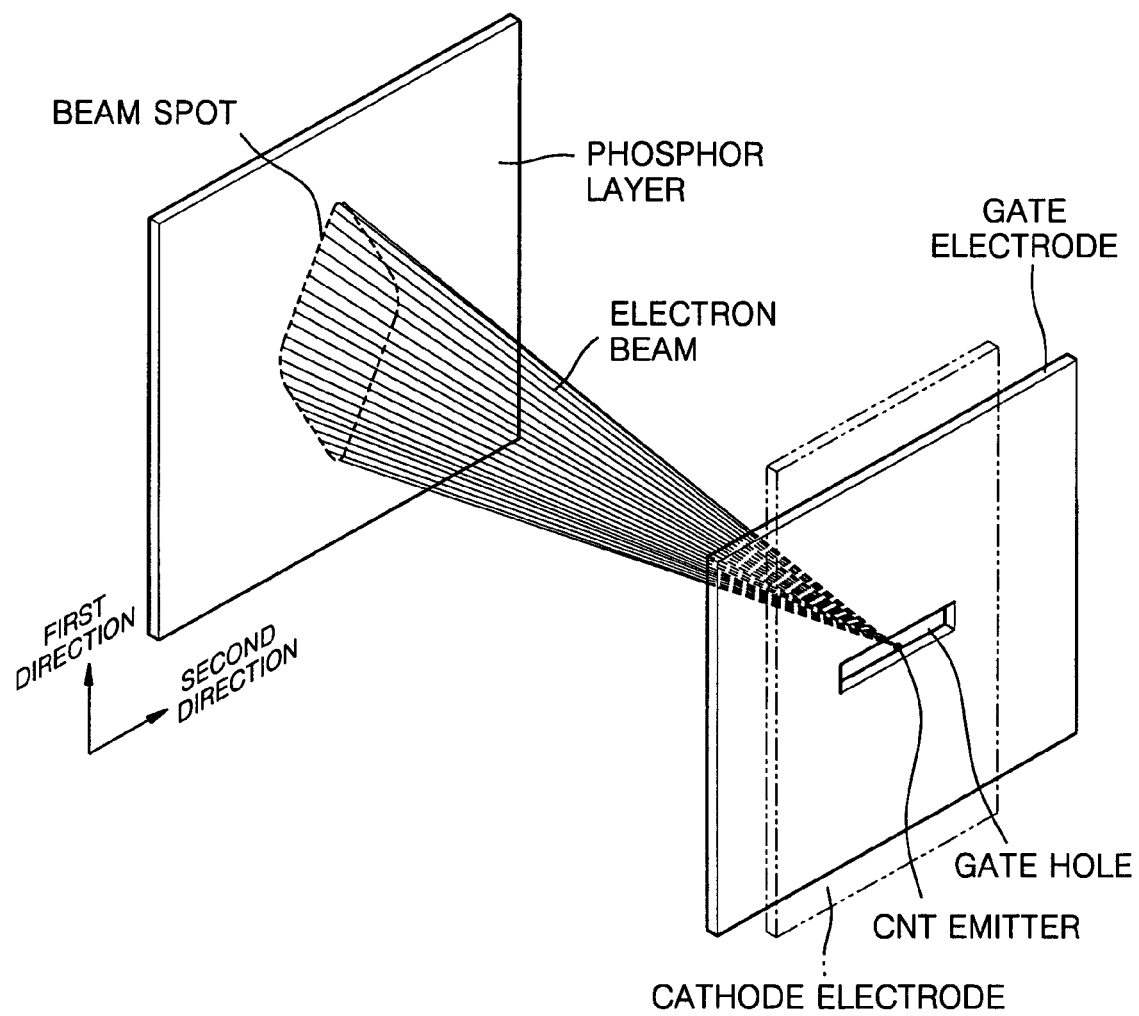
FIG. 9A illustrates the shape of an electron beam formed by an enlongated gate hole in the field emission device according to the present invention.
Figure 9B:
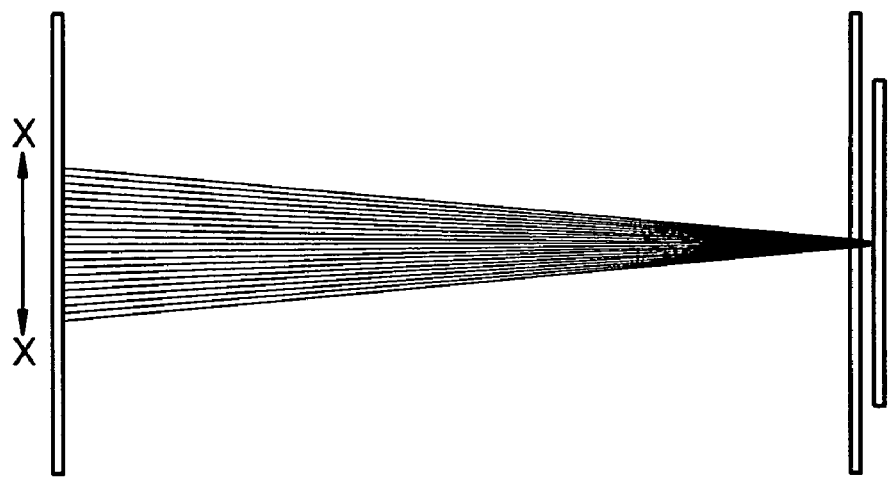
FIG. 9B illustrates the shape of an electron beam in a first direction formed by an enlongated gate hole in the field emission device according to the present invention.
Figure 9C:
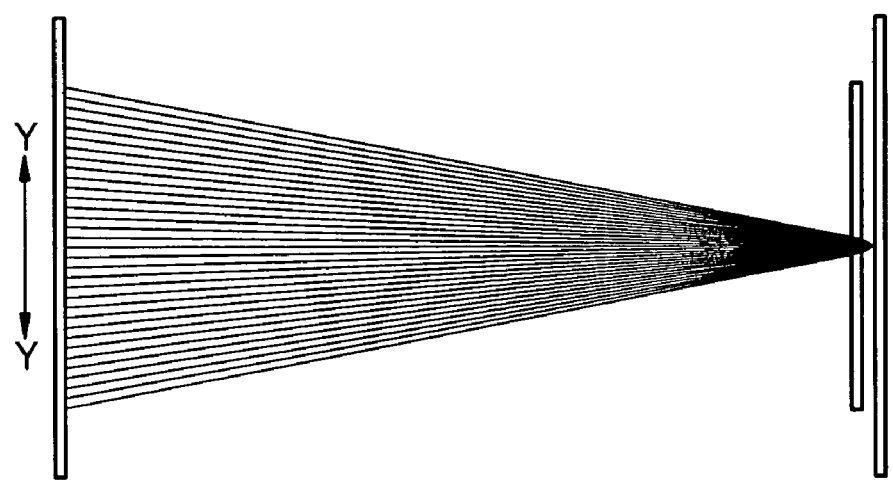
FIG. 9C illustrates the shape of an electron beam in a second direction formed by an enlongated gate hole in the field emission device according to the present invention.
Figure 10:
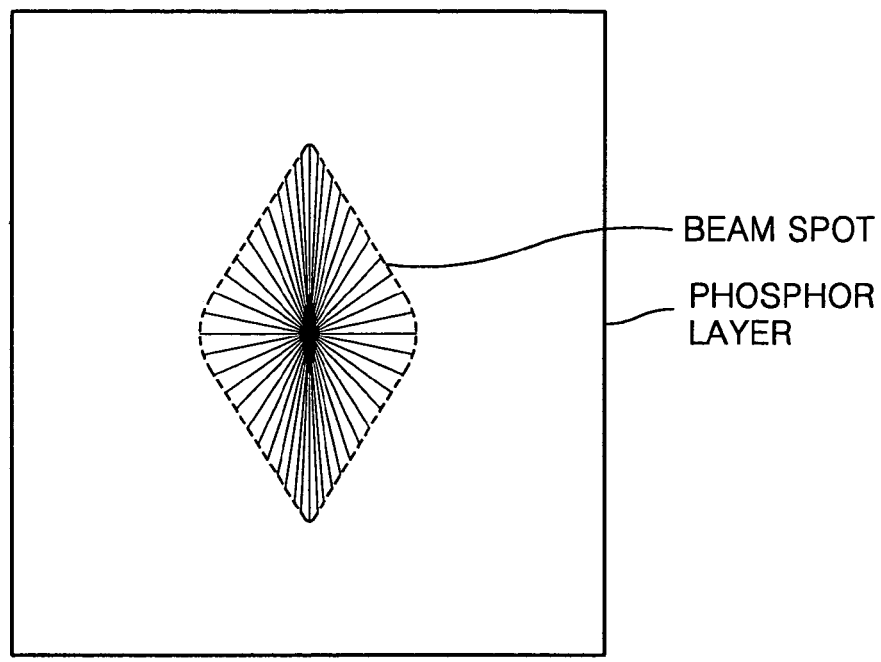
FIG. 10 illustrates the shape of an electron beam spot formed on a phosphor layer by the field emission device according to the present invention.

FIG. 9A illustrates the generation of an electron beam using an enlongated gate hole and the formation of a spot for a phosphor layer, which are features of the present invention, in the field emission device according to the present invention. FIG. 9B illustrates the emission shape of an electron beam in a narrow direction of the gate holes H and H', i.e., in a first direction, and FIG. 9C illustrates the emission shape of an electron beam in a wide direction of the gate holes H and H', i.e., in a second direction. As shown in FIGS. 9A and 9C, during a field emission operation, a strong electric field is formed in the first direction of the gate hole H, i.e., in a lengthwise direction of the cathode K, and a weeker electric field is formed in the second direction of the gate hole H. Thus, an emission angle of an electron beam is larger in the first direction in which the strong electric field is formed and smaller in the second direction. Accordingly, an asymmetric beam spot on a phosphor layer is enlongated in a direction orthogonal to the direction of enlongation of the gate hole H. FIG. 10 illustrates the shape of an electron beam spot formed on a phosphor layer by the field emission device according to the present invention.

Figure 11A:
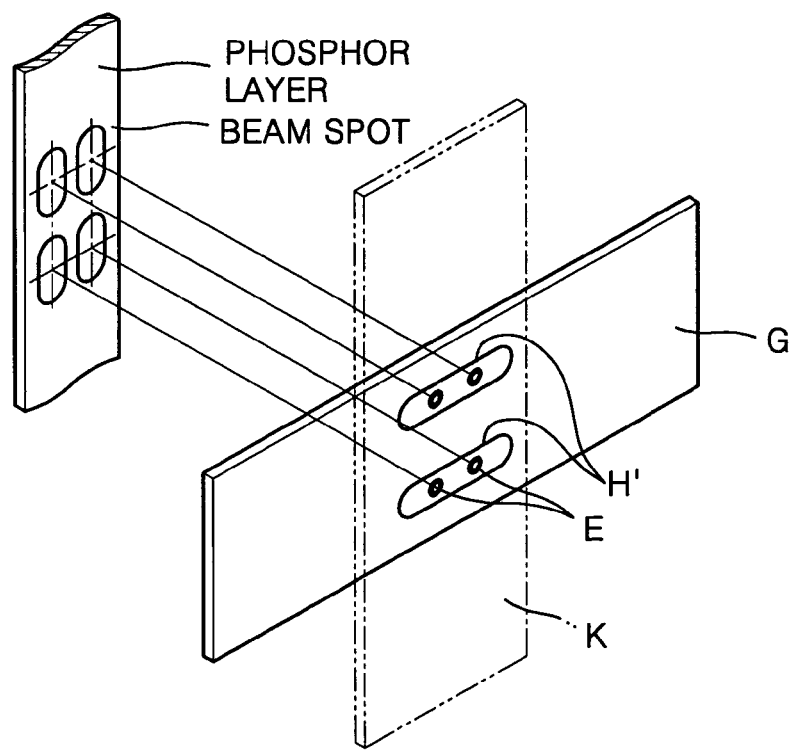
FIG. 11A illustrates a pattern of electron beams formed on a phosphor layer by four electron guns in the field emission device according to the present invention.
Figure 11B:
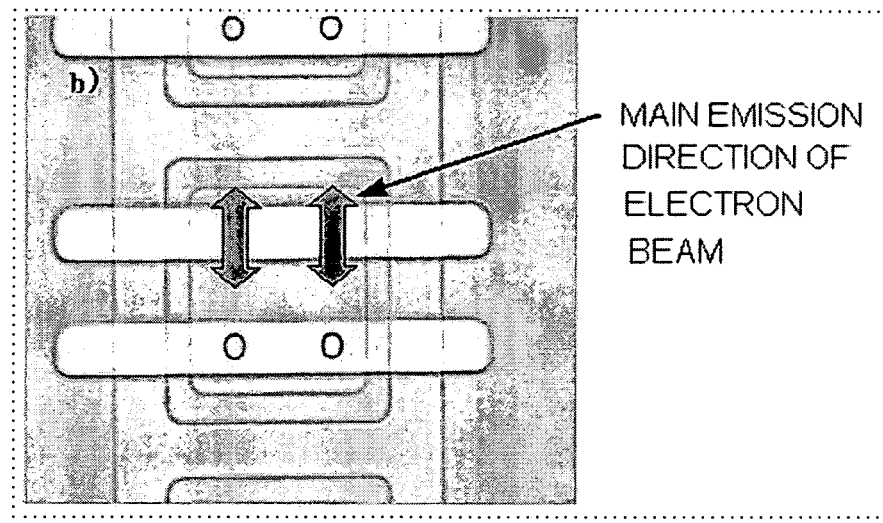
FIG. 11B is a plan view of an actually-manufactured field emission device according to the present invention and illustrates a main emission direction of an electron beam formed by an enlongated slot.

The asymmetric electric field formed by the enlongated gate holes H and H' alters the shape of an electron beam, thereby forming a beam spot that is enlongated in a single direction. As a result, unwanted dispersion of an electron beam, which is a problem in the prior art, is suppressed such that an electron beam spot is formed only on a desired phosphor layer. FIG. 11 illustrates a case where an electron beam spot is formed on a phosphor layer by the field emission device shown in FIG. 7, according to the present invention. As shown in FIG. 11, when an electron beam is emitted from the four CNT emitters on the cathode K, the electron beam spot that extends in the first direction by the gate hole H' enlongated in the second direction is formed on the phosphor layer. In this case, the electron beam spot and the phosphor layer both extend in the first direction, and thus, the electron beam may be formed only on the phosphor layer. The field emission device shown in FIG. 11 has four electron guns corresponding to one pixel. Each of the four electron guns radiates an electron beam onto a target point on the phosphor layer. In this case, an asymmetric electron beam spot that is enlongated in a longitudinal direction (second direction) due to the enlongated (first direction) gate hole, is formed. The enlongated (second direction) shape of the beam spot complies with the striped pattern of the phosphor layer in an image display device such that an image having high color purity and luminance can be displayed in the image display device.

Figure 12:
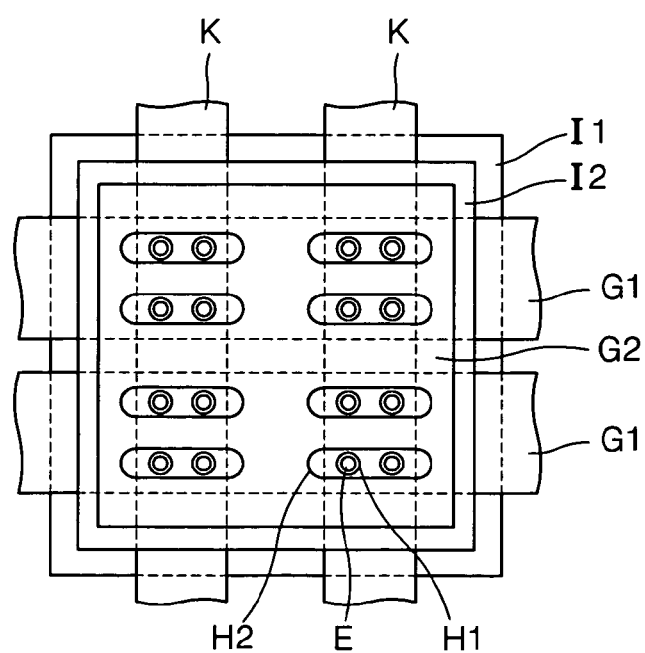
FIG. 12 is a schematic plan view illustrating an embodiment of a double gate-type field emission device according to the present invention.

FIG. 12 is a schematic plan view illustrating an embodiment of a field emission device in which a greater number of electron guns are arranged to correspond to each pixel than in the above-described embodiments. Referring to FIG. 12, cathodes K that extend in a lengthwise direction (first direction) are arranged side by side in a widthwise direction (second direction), and gate electrodes G having a width greater than in the above-described embodiments extend in the second direction. An insulating layer I is interposed between the gate electrodes G and the cathodes K. CNT emitters E forming eight electron guns, and four enlongated gate holes H', each corresponding to two CNT emitters are formed at portions where the gate electrodes G and the cathodes K cross. In the present embodiment, an electron beam control mechanism is as described above.

The main feature of the field emission device according to the present invention is the shape of a gate hole which induces electrons from a CNT emitter and forms an electron beam. The inventive gate hole shape may also be used in a so-called double gate-type field emission device using two gate electrodes.

The field emission device shown in FIG. 12 is actually an embodiment of a double gate-type field emission device according to the present invention. Referring to FIG. 12, the cathodes K in the first direction and first gate electrodes G1 in the second direction are orthogonally arranged, and a first insulating layer I1 is formed therebetween. A second insulting layer I2 is formed on the first gate electrodes G1, and a second gate electrode G2 is formed on the second insulating layer I2. As described above, the cathodes K and the first gate electrodes G1 are arranged in an X-Y matrix shape, and the second gate electrode G2 is formed as a single layer on the second insulating layer I2. In the embodiment of the present invention shown in FIG. 12, four CNT emitters E are provided at each portion where the cathodes K cross the first gate electrodes G1.

The CNT emitters E are formed on the cathodes K, and four enlongated gate holes H1, each corresponding to two CNT emitters E, are formed in each of the first gate electrodes G1. Also, the first and second insulating layers I1 and I2 electrically insulate the first and second gate electrodes G1 and G2 and the cathodes K, as in a traditional field emission device, and have through holes (not shown) corresponding to the CNT emitters E.

Asymmetric control of the electron beam in the double gate-type field emission device described above is performed by enlongated gate holes H2 formed in the second gate electrode G2. Here, in the present embodiment, the enlongated gate holes H2 are formed in the uppermost second gate electrode G2, and gate holes H1 formed in the lower first gate electrodes G1 have a circular shape as in the prior art. However, in another embodiment, the gate holes H1 formed in the first gate electrodes G1 may also be enlongated. In this case, all of the gate holes H1 and H2 formed in the first gate electrodes G1 and the second gate electrode G2 extend in the same direction.

Figure 13:
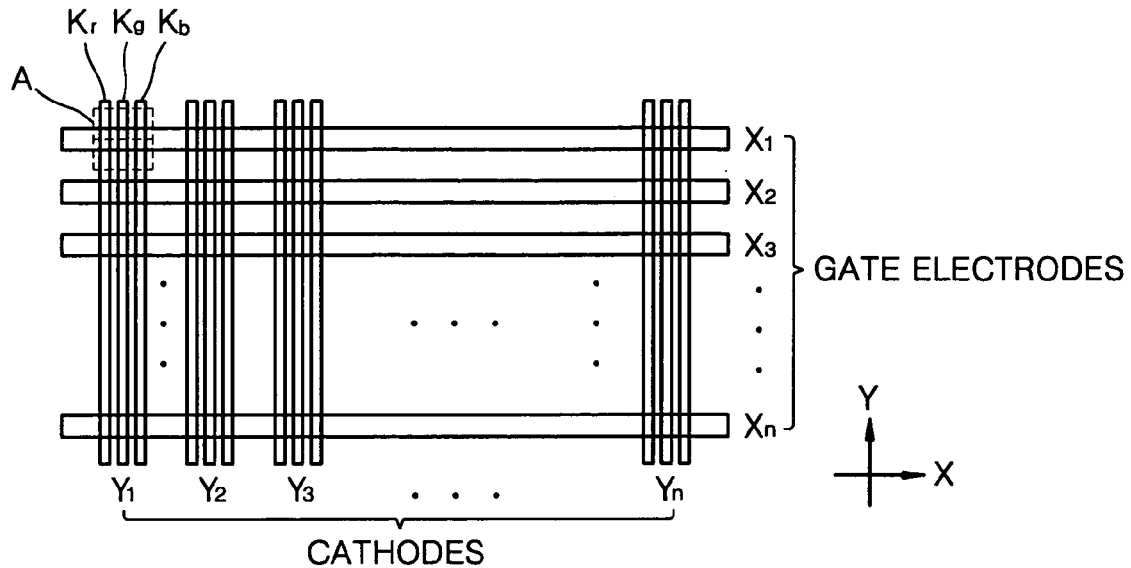
FIG. 13 illustrates the arrangement of cathodes and gate electrodes of a color display device employing the field emission device according to the present invention.

FIG. 13 illustrates the arrangement of cathodes and gate electrodes of a color display device employing the field emission device according to the present invention. Referring to FIG. 13, a plurality of cathodes $Y_1, Y_2, \ldots,$ and $Y_n$ having first through third sub-cathodes $K_r, K_g,$ and $K_b$ that extend in a first direction Y are arranged in parallel, and a plurality of gate electrodes $X_1, X_2, X_3, \ldots,$ and $X_n$ that extend in a second direction X orthogonal to the first direction Y are arranged in parallel. The sub-cathodes $K_r$, $K_g,$ and $K_b$ are used to display images of three colors such as red, green, and blue, as in a traditional color display device.

Figure 14:
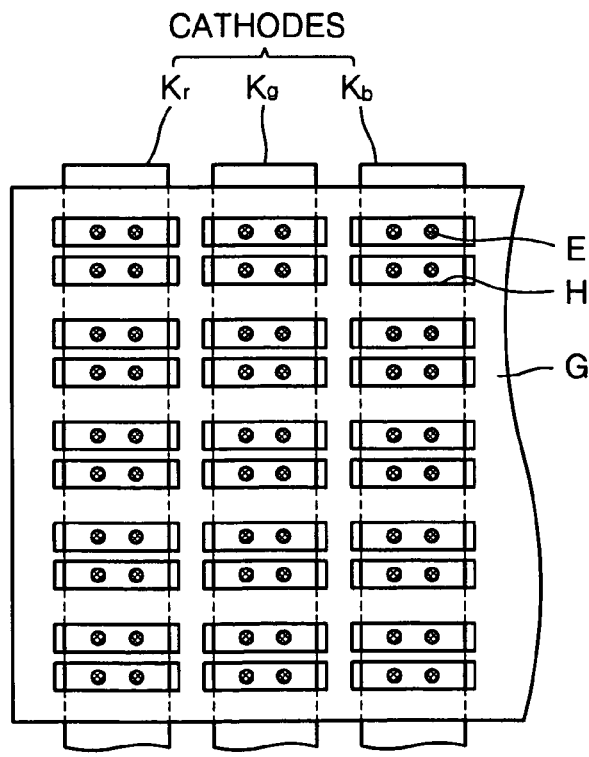
FIG. 14 is a magnified view of portion A of FIG. 13, illustrating a structure in which a cathode is divided by colors so as to display colors.

Portions A where each of the cathodes $Y_1, Y_2, \ldots,$ and $Y_n$ crosses each of the gate electrodes $X_1, X_2, X_3, \ldots,$ and $X_n$ correspond to color pixel areas, and thus, means for emitting electrons, that is, CNT emitters E and gate holes H corresponding to the CNT emitters E exist at the portions A. Referring to FIG. 14 which is an enlarged view of the portion A of FIG. 13, CNT emitters E are formed on the sub-cathodes $K_r, K_g,$ and $K_b$. Two CNT emitters E for each line are formed on each of the sub-cathodes $K_r, K_g,$ and $K_b$. A plurality of enlongated gate holes H, each corresponding to two CNT emitters E, are formed in the gate electrode G. In FIG. 14, the field emission device has only one gate electrode. However, in alternative embodiments, there may be two gate electrodes.

The above-described embodiments are applied to an image display device, in particular, to a color image display device as described above. In the color image display device, one color pixel is composed of red, green, and blue, and thus, cathodes and gate electrodes are arranged to correspond to the color pixel. In general, cathodes are arranged to correspond to the color pixel composed of red, green, and blue. The arrangement of these electrodes is well known, and thus, will not be further described.

The cathodes may be formed of a transparent conductor such as indium tin oxide (ITO), an opaque conductor such as a silver paste, or two or more materials stacked on top of each other.

Figure 15:
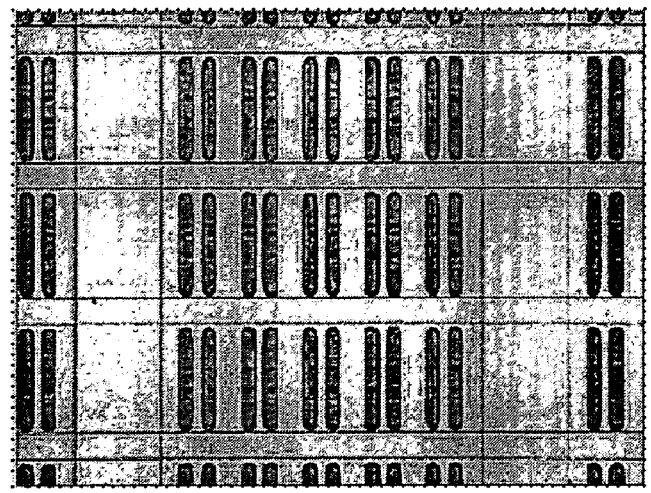
FIG. 15 is a microscopic photograph showing an actually-manufactured field emission device according to the present invention.
Figure 16:
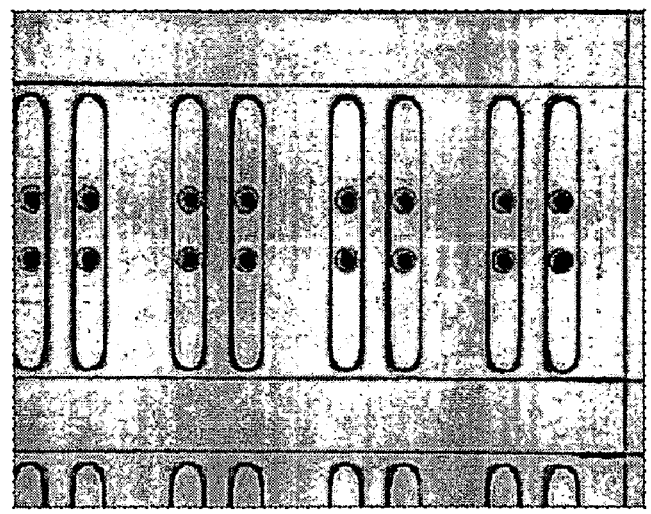
FIG. 16 is a further magnified microscopic photograph showing the field emission device shown in FIG. 15.

FIG. 15 is a microscopic photograph showing an actually-manufactured field emission device according to the present invention, and FIG. 16 is a further magnified microscopic photograph of the field emission device.

Figure 17:
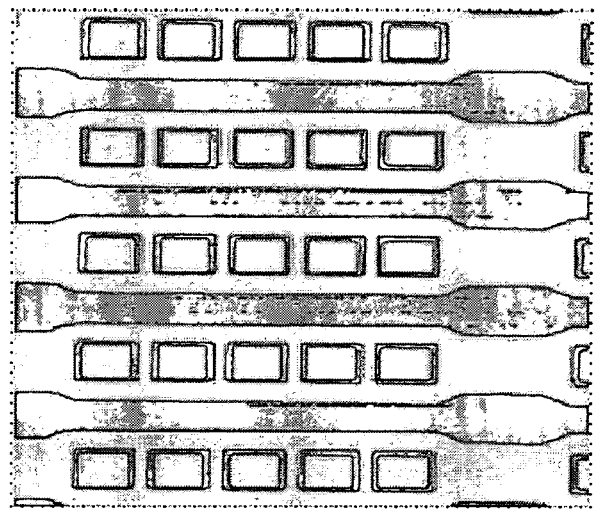
FIG. 17 illustrates an arrangement of cathodes formed on a substrate, in the field emission device according to the present invention.

FIG. 17 is a microscopic photograph showing the arrangement and structure of a lowermost cathode in the field emission device according to the present invention. In FIG. 17, belt-shaped light portions represent cathodes formed of ITO. Rectangular edge portions in the cathodes are portions from which ITO is removed, and CNT emitters are formed in light rectangular areas formed in those portions.

Figure 18:
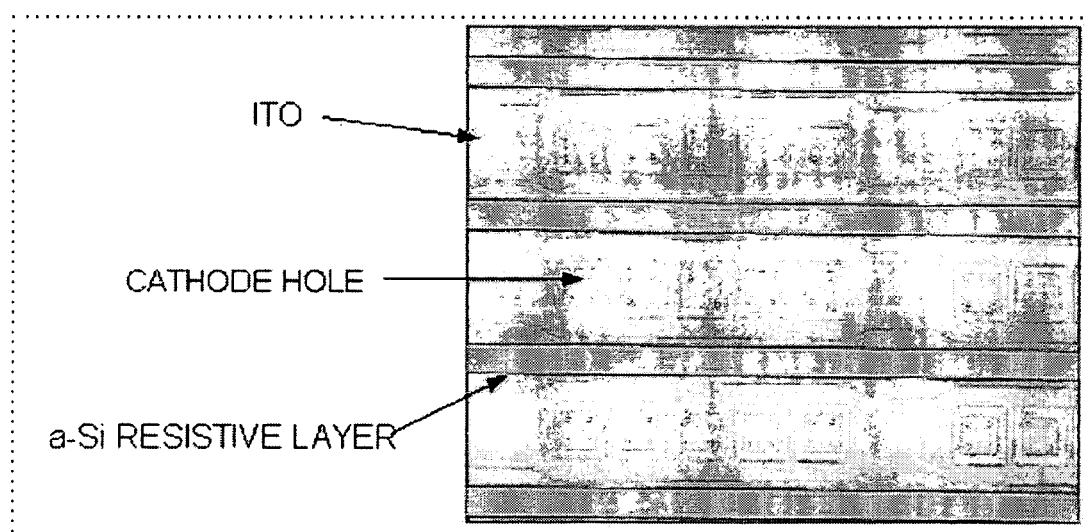
FIG. 18 is a microscopic photograph showing the state in which an amorphous silicon resistive layer is formed on the cathodes shown in FIG. 17.

FIG. 18 is a microscopic photograph showing the state in which belt-shaped resistive layers are formed on the ITO cathodes shown in FIG. 17. A resistive layer is formed on each cathode. In this case, in each rectangular emitter area, through holes are formed exposing the ITO cathode. Small circular through holes formed in the resistive layer are shown in FIG. 18. The rectangular emitter areas are electrically connected to the belt-shaped ITO electrode through the resistive layer. The electrodes and resistive layers are arranged in consideration of cross-talk between pixels and electrical characteristics.

The main feature of the field emission device according to the present invention is that by making a gate hole enlongated, an electric field is manipulated to form an enlongated electron beam spot. Here, the purpose of enlongating a beam spot is to provide better coverage of an area of a phosphor layer meant to be irradiated and to prevent irradiation of other areas. In general, the cathodes extend in the same direction as stripes of phosphor. Thus, preferably, the electron beam spot is enlongated in the same direction as the cathode or phosphor layer.

Enlongating a beam spot is more effectively accomplished by changing the shape of the CNT emitter in addition to enlongating the gate hole of the gate electrode as described above.

Figure 19:
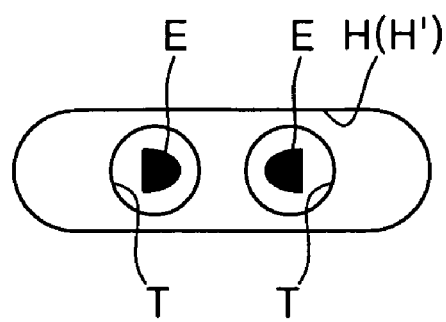
FIG. 19 shows a modified example of a CNT emitter used in an embodiment of a field emission device according to the present invention.
Figure 20:
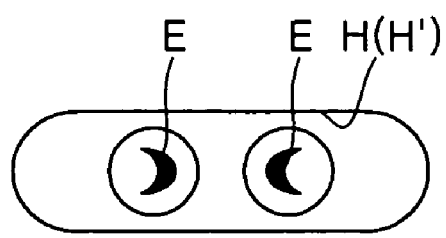
FIG. 20 shows a modified example of a CNT emitter used in an embodiment of a field emission device according to the present invention.

FIG. 19 shows a modified example of a CNT emitter according to the present invention. As shown in FIG. 19, a pair of half-circle CNT emitters E are formed inside an enlongated gate hole. In this case, rounded portions of the CNT emitters E face each other, and straight edge portions face away from each other. Meanwhile, in another modified example of a CNT emitter shown in FIG. 20, the CNT emitters E are crescents. The shape of CNT emitters E may be controlled by the shape of the above-described through holes formed in the amorphous resistive layer or the shape of the above-described openings.

In this way, by removing the outer edges of the CNT emitters, wide-angle electron emission which mostly comes from the outer edges of the CNT emitters, can be suppressed.

Figure 1:
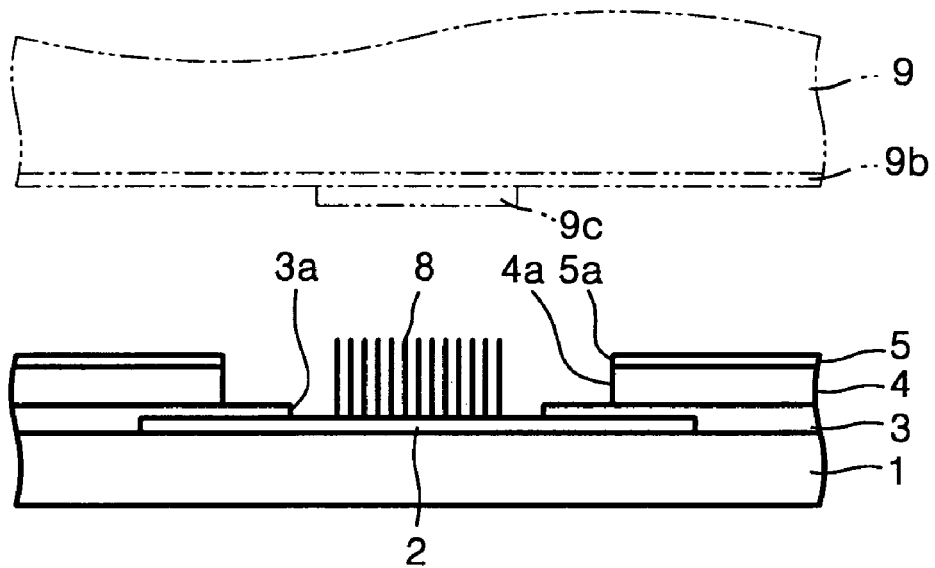
FIG. 1 is a schematic cross-sectional view illustrating the structure of a conventional single gate-type field emission device.
Figure 2:
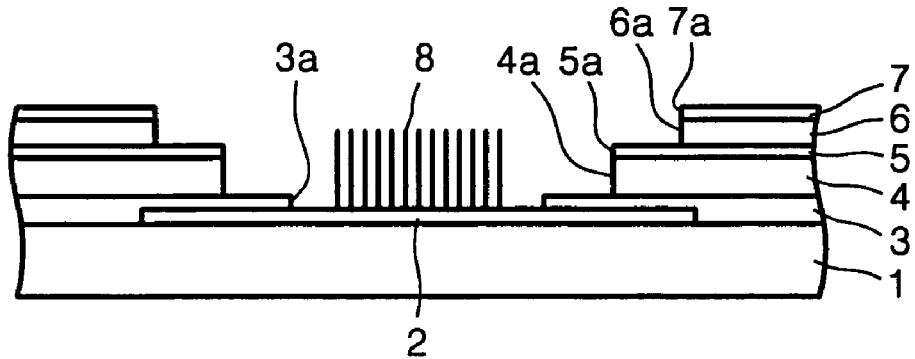
FIG. 2 is a schematic cross-sectional view illustrating the structure of a conventional double gate-type field emission device.
Figure 3:
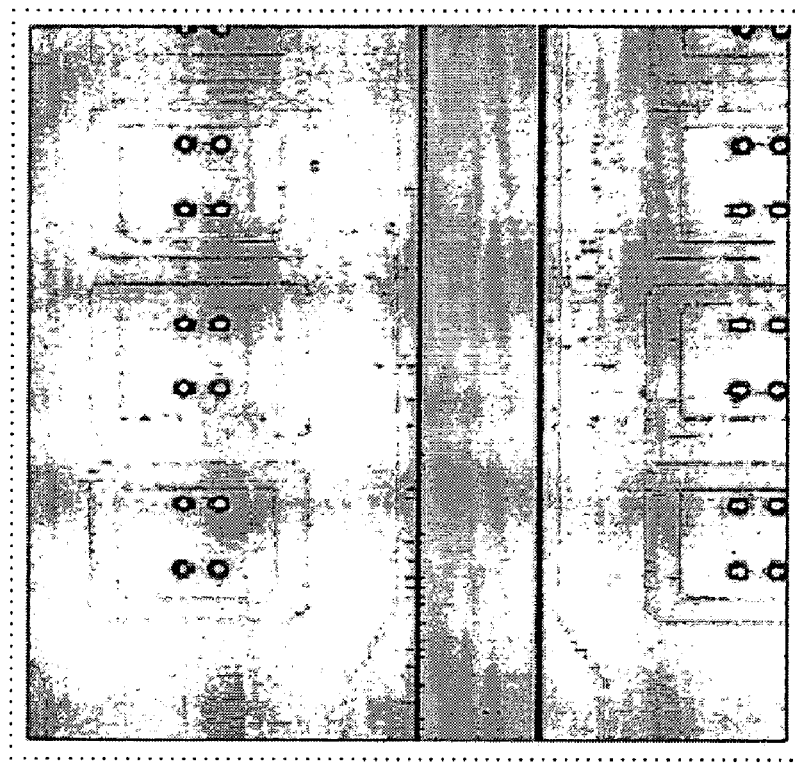
FIG. 3 is a microscopic photograph showing the structure of an actually-manufactured conventional field emission device.
Figure 4:
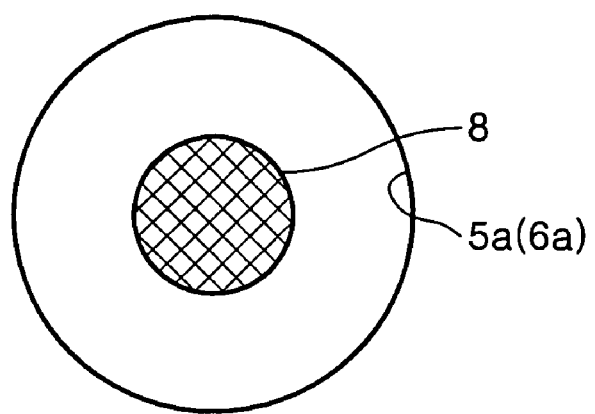
FIG. 4 is a diagram illustrating the shape and arrangement of a CNT emitter and a gate hole of a conventional field emission device.

In manufacturing a field emission display after making a field emission device, electrons should be made to collide with only phosphor of a desired color so as to improve color purity and luminance. Conventional CNT emitters have the circular shape shown in FIG. 4, and thus, some emitted electrons collide with adjacent phosphor that is not intended to be irradiated, thereby lowering color purity and the luminance.

Figure 21:
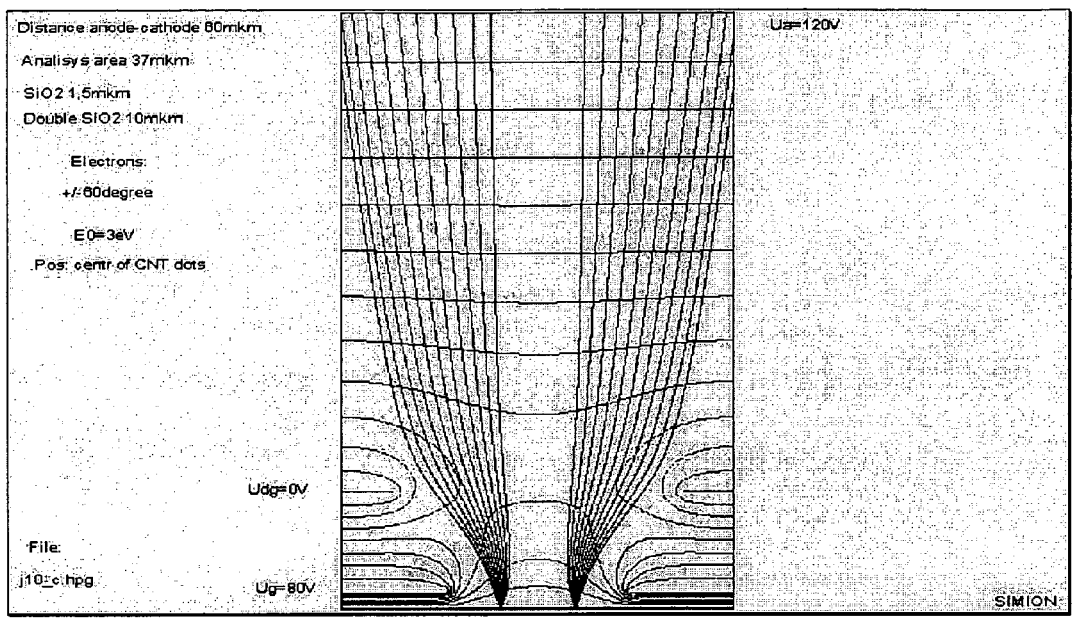
FIGS. 21 through 23 are graphs comparing electron emission from different parts of two conventional CNT emitters having a circular shape shown in FIG. 4.
Figure 22:
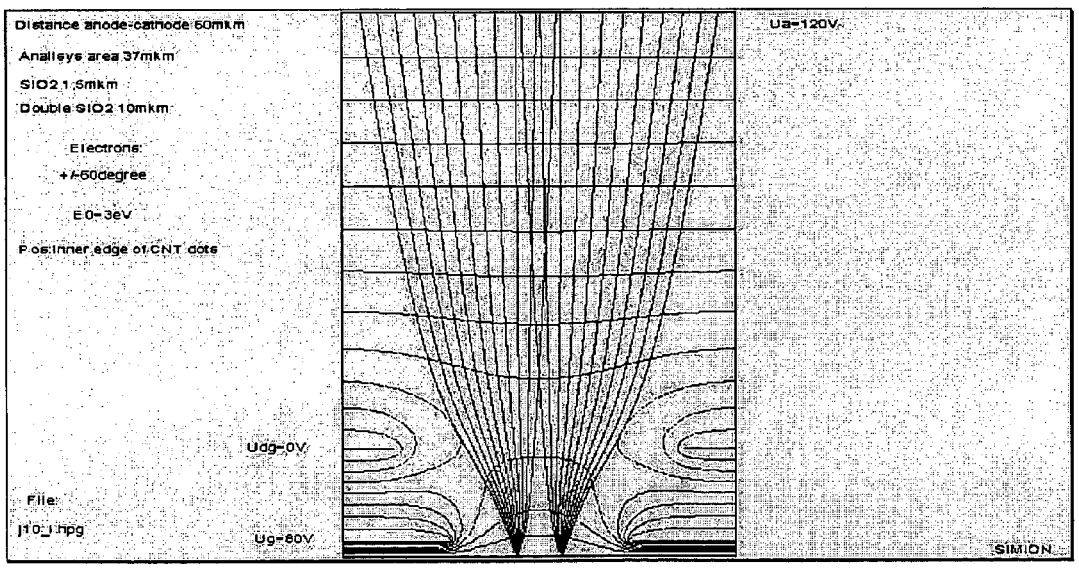
Figure 23:
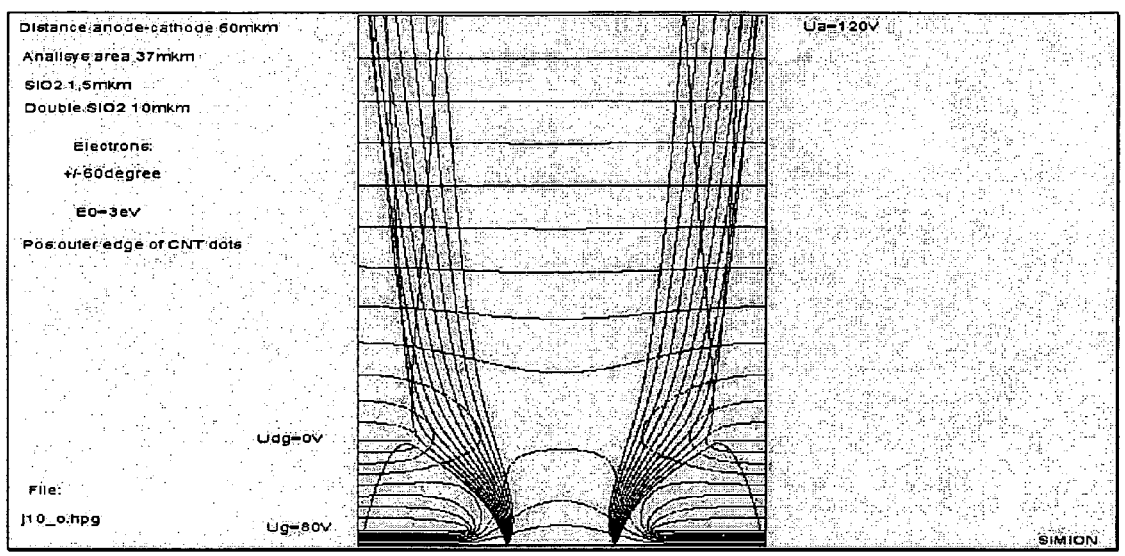

FIGS. 21 through 23 are graphs comparing electron emission for each part of two conventional CNT emitters having a circular shape. FIG. 21 illustrates divergence of electron emitted from the centers of the two side by side CNT emitters, FIG. 22 illustrates divergence of electron emitted from inner edges of the two side by side CNT emitters, and FIG. 23 illustrates divergence of electron emitted from opposite outer edges of the two side by side CNT emitters.

As shown in FIG. 21, electron beams from the centers of the two CNT emitters diverge from the phosphor formed directly on the two CNT emitters and run into the outer edges of the two CNT emitters. Also, as shown in FIG. 23, electron beams emitted from the outer edges of the two CNT emitters diverge from the phosphor but run into a gate electrode and thus, generate a gate leakage current. However, as shown in FIG. 22, electron beams emitted from each inner edge of the two CNT emitters are not greatly diverged from but are incident on the phosphor.

As described above, by removing the outer edges of the two CNT emitters, the phenomenon shown in FIG. 23 is prevented. According to the present invention, CNT emitters are formed to have the shape shown in FIG. 19 or FIG. 20 using an electron progressing mechanism. By removing an outer half circle of the CNT emitters, electron emissions are emitted only by an inner half circle or crescent of the CNT emitters. An electron emission device having the above structure allows electrons to collide with only desired phosphor such that color purity is improved. This has been experimentally verified.

In the field emission device using carbon nanotubes (CNTs) as an electron emission source according to the present invention, gate holes are enlongated, and CNT emitters are shaped such that electrons are prevented from colliding with unintended portions so that color purity and luminance are improved.

While this invention has been particularly shown and described with reference to preferred embodiments thereof, it will be understood by those skilled in the art that various changes in form and details may be made therein without departing from the spirit and scope thereof as defined by the appended claims.

What is claimed is:

1. A field emission device comprising:
   a cathode on which one or more carbon nanotube (CNT) emitters are arranged;
   a gate insulating layer having one or more through holes through which electrons emitted from the CNT emitters pass, each of the through holes having a generally circular cylindrical shape; and
   a gate electrode having an elongated-oval shaped gate hole that corresponds to the through holes of the gate insulating layer and that forms an electric field having different strengths in a first direction and in a second direction orthogonal to the first direction,
   whereby the electrons emitted by each of the CNT emitters make an asymmetrically elongated beam spot.

2. The device of claim 1, wherein at least two CNT emitters are disposed side by side and correspond the gate hole.

3. The device of claim 2, wherein the two CNT emitters have a half-circle or crescent shape.

4. A field emission device comprising:
   a plurality of parallel cathodes that extend in a first direction;
   a plurality of parallel gate electrodes which extend in a second direction orthogonal to the first direction and have elongated-oval shaped gate holes formed where the cathodes overlap, each of the gate holes forming an electric field with different strengths in the first and second directions;
   a plurality of carbon nanotube (CNT) emitters formed on the cathodes, each of the gate holes corresponding to one or more of the CNT emitters; and
   a gate insulating layer interposed between the cathodes and the gate electrodes and having through holes through which electrons emitted from the CNT emitters pass, the through holes having a generally circular cylindrical shape,
   whereby the electrons emitted by each of the CNT emitters make an asymmetrically elongated beam spot.

5. The device of claim 4, wherein the gate holes are elongated in the second direction.

6. The device of claim 4, wherein the two CNT emitters are disposed side by side and correspond to one of the gate holes.

7. The device of claim 5, wherein the two CNT emitters are disposed side by side and correspond to one of the gate holes.

8. The device of claim 6, wherein the two CNT emitters have a half-circle or crescent shape.

9. The device of claim 7, wherein the two CNT emitters have a half-circle or crescent shape.

10. A field emission device comprising:
    a plurality of parallel cathodes that extend in a first direction;
    a plurality of carbon nanotube (CNT) emitters formed on the cathodes;
    a plurality of parallel first gate electrodes which extend in a second direction orthogonal to the first direction and have first gate holes formed where the cathodes overlap, each of the first gate holes corresponding to one or more of the CNT emitters;
    a first gate insulating layer being formed between the cathodes and the first gate electrodes and having first through holes that correspond to the first gate holes and have a generally circular cylindrical shape;
    a second gate insulating layer being formed on the first gate electrodes and having second through holes, each of the second through holes corresponding to one or more of the first gate holes and having an elongated-oval shape; and
    a second gate electrode which is formed on the second gate insulating layer and has elongated-oval shaped second gate holes, each of the second gate holes forming an electric field that has different strengths in the first and second directions.

11. The device of claim 10, wherein each of the first gate holes has an elongated-oval shape.

12. The device of claim 11, wherein the first and second gate holes are elongated in the second direction.

13. The device of claim 10, wherein at least two CNT emitters are disposed side by side and correspond to one of the second gate holes.

14. The device of claim 11, wherein at least two CNT emitters are disposed side by side and correspond to one of the second gate holes.

15. The device of claim 12, wherein at least two CNT emitters are disposed side by side and correspond to one of the second gate holes.

16. The device of claim 13, wherein the two CNT emitters have a half-circle or crescent shape.

17. The device of claim 14, wherein the two CNT emitters have a half-circle or crescent shape.

18. The device of claim 15, wherein the two CNT emitters have a half-circle or crescent shape.

* * * * *